United States Patent [19]

Foerst

[11] Patent Number: 5,209,029
[45] Date of Patent: May 11, 1993

[54] CONSTRUCTION ASSEMBLY FOR AWNINGS

[75] Inventor: George Foerst, Pompano Beach, Fla.

[73] Assignee: Extrusion 2001, Inc., Pompano Beach, Fla.

[21] Appl. No.: 777,760

[22] Filed: Oct. 18, 1991

[51] Int. Cl.$^5$ ............................................. E04H 15/18
[52] U.S. Cl. ................................. 52/63; 52/74; 52/222; 160/392; 160/395; 160/398; 24/459
[58] Field of Search ............... 52/63, 74, 222; 160/327, 392–398; 24/455–462

[56] References Cited

U.S. PATENT DOCUMENTS

| | | | |
|---|---|---|---|
| 4,453,585 | 6/1984 | Ruggeberg et al. | 52/222 X |
| 4,731,960 | 3/1988 | Sease | 52/222 X |
| 4,788,806 | 12/1988 | Sease | 52/222 |
| 4,926,605 | 5/1990 | Milliken et al. | 52/63 |

FOREIGN PATENT DOCUMENTS

| | | | |
|---|---|---|---|
| 8264596 | 7/1974 | Fed. Rep. of Germany | 52/222 |
| 2575243 | 3/1986 | France | 52/222 |

Primary Examiner—Richard E. Chilcot, Jr.
Attorney, Agent, or Firm—Malin, Haley, DiMaggio & Crosby

[57] ABSTRACT

A construction assembly for attaching a flexible covering material to a fixture. The construction assembly employs a reusable support member having a pair of substantially circular openings with griping teeth protruding therefrom. At least one elongated locking bead employed for securely positioning a covering within the circular openings and an elongated trim pad operatively associated with the support member for securely maintaining locking beads in position.

16 Claims, 4 Drawing Sheets

CONSTRUCTION ASSEMBLY FOR AWNINGS

FIELD OF THE INVENTION

This invention relates generally to fasteners, and more particular, to an improved construction assembly for securely fastening coverings made of flexible material to a fixed structure.

BACKGROUND OF THE INVENTION

Coverings are universally known as a means for shielding objects against wind, rain, ultra-violet rays, theft, and so forth. A covering can be made of any material, however, a covering made from flexible materials provide unique advantages over rigid coverings. Coverings can be colorful, are maintenance free, are less expensive, lighter in weight, and easier to install than awnings constructed of rigid material. Typically, flexible coverings are constructed of canvas, polyethylene, vinyl, or the like flexible materials.

Awnings constructed of flexible coverings are of particular interest for they are often used as a decorative item in addition to their shielding ability. Further, flexible coverings allow the awning to be shaped into patterns not possible with rigid coverings. Thus, flexible coverings effectively provide consumers with the ability to present a distinctive and functional display of near trademark appearance unique to the consumers preference.

Despite the type of flexible covering material employed, flexible coverings must be securely fastened in position to prevent damage to the coverings. Conventional fastening devices utilize a support member to which the flexible covering is attached. The ideal support member having a means to fasten a covering in a fixed position that is easily installed, allows ease of covering replacement, and preferably hides the fastening device from view. Heretofore no such support member exists.

A support frame can be shaped into most any design. For example, an awning placed on the exterior of a building may employ a convoluted design enhanced by back lighting. Or, the covering may be made of translucent material having patterns within the covering further adding to its unique decorative appearance when backlit.

Support members are typically placed along each edge of the covering to secure the covering in a taunt position. The less support frames employed, the more critical the fastening device for maintaining the covering in a taunt position.

Support members should further provide a method of installation that will provide taunt coverings despite installation shortcomings. If an installer secures the covering loosely, the covering may sag or flap in the wind. Installation in too taunt of position may cause the frame to bend or the covering to tear. The use of permanent fastening devices such as staples, rivets, or nails makes the installation especially critical as once the covering is punctured, it cannot be repositioned. For example, if an installer stapled the covering to a support member incorrectly, the covering may have to be replaced or used "as is" leaving unsightly puncture holes. The puncture holes weakening the material allowing wind and rain to seep through the material causing it to weaken and/or propagate into a tear.

Replacement of a covering must also be taken into consideration as removal of the covering should be accomplished without damage to the support frame. The use of permanent fastening devices, mentioned above, results in a longer disassembly time as the fastening devices must be removed before replacement of the covering. If the covering is simply pulled from its attachment, the frame could be bent. If the covering is cut from the attachment, the excess material will inhibit installation of a replacement covering. Once the permanent fastening device is removed, puncture holes remain in the support member weakening the support member and destroying the sealing ability of the support member.

Finally, use of permanent fastening devices presents an unforgiving situation leading to unnecessary replacement of coverings in certain situations. Proper support frame design requires the ability to securely support the covering through a large variety of adverse conditions such as gusty winds and heavy snow. If the awning cannot handle the condition a permanently fastened covering will rip from the support member or bend the support member. Or, if a person accidentally steps on a covering that is permanently fastened, the covering or support member may be irreparably damaged.

Prior art illustrates the attempts made at providing a construction assembly capable of surmounting the problems described above. U.S. Pat. No. 3,987,835, issued to Bloomfield, discloses the use of cylindrical cords, or lock beads, permanently fastened in a hem of the covering which, when pressed into a channel member, lock the covering to the channel member. The disclosure requires that the beads be sewn into the covering providing multiple punctures.

U.S. Pat. No. 4,926,605, issued to Milliken et al., discloses a construction assembly requiring the stapling of a covering into a support member followed by insertion of a flexible fastener into the support. The stapling of the covering does not allow for mistakes during installation, requires puncturing of the covering, and hinders covering replacement by requiring removal of the staples before covering replacement can be performed.

U.S. Pat. No. 2,897,889, issued to Kessler, discloses the use of a splined axially serrated cord inserted into a channel member having a lip for attaching a screen to the channel member. Alternatively, a plurality of ridges may be employed within the channel for additional frictional engagement.

U.S. Pat. No. 2,597,401, issued to Swanson, discloses a fabric panel clamp wherein a channel member has two cavities for receiving engagement strips, the cavities formed by a center protrusion and sideward encompassing wall. Cloth is wrapped around each strip before insertion into the cavity to form a juncture.

The present invention is directed to a construction assembly that does not require permanent fastening of the covering to a support member, the support member employs a double concave insertion section allowing for releasably fastening a covering therein. Heretofore, no teaching is made of a device or apparatus that allows simplified installation and replacement of coverings having a releasably means for securely fastening a covering thereto. It is to the effective resolution of the problems and associated shortcomings of the prior art that the improved construction assembly of the instant invention is directed.

SUMMARY OF THE INVENTION

It is the principal feature of the instant invention to provide an apparatus that overcomes the shortcomings and associated problems described above. The invention providing an improved construction assembly with a reusable fastening means for coverings concealed within the confines of a support member.

Generally, the apparatus can be described as a construction assembly for attaching a flexible covering material to a fixture such as a building exterior. The construction assembly employs a reusable aluminum channel or support member having a base, a pair of upstand wall means fixed to the base and an insertion lip projecting inwardly from each of the walls. A traverse support member is disposed between the walls in a plane parallel to the base.

Within the channel is a pair of elongated substantially circular surfaces formed from an inner surface of the traverse support member in conjunction with each of the walls and associated insertion lips. A plurality of teeth is spatially spaced within the circular surface.

Upon placement of a covering within the circular surfaces, at least one reusable elongated lock bead is made available for disposition within the circular surfaces for releasably fastening the covering. An elongated deformable trim pad having two coplanar longitudinal slots defined therein maintains at least one of the elongated beads in position by frictional engagement. The trim tab further fastening the lock bead(s) in position and providing a seal for the channel insertion end.

Therefore, it is an object of the instant invention to provide an apparatus for securing canvas, polyethylene, vinyl, and the like flexible materials without the necessity of puncturing the material, further eliminating the need for specialized installation equipment such as staple guns.

Yet another object of the instant invention is to provide a construction assembly that is simple to install, will not damage coverings during installation even if improperly positioned, and allows ease of covering replacement.

Still another object is to provide a construction assembly device that employs a plurality of gripping teeth in combination with a smooth or splined lock bead for securely fastening of a covering.

Yet still another object of the instant invention is to provide a releasable fastening means to prevent tearing of the covering or bending of the support members if subjected to a pressure gradient exceeding the awning design.

Other and further objects, features, and advantages of the invention will become evident upon the reading of the following specification taken in conjunction with the drawing.

BRIEF DESCRIPTION OF THE DRAWINGS

The invention will be more readily understood with reference to the accompanying drawings, wherein.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure. The aims and objects of the invention are accomplished by providing a construction assembly that can securely hold coverings and allows for ease of covering replacement.

Figure 1:
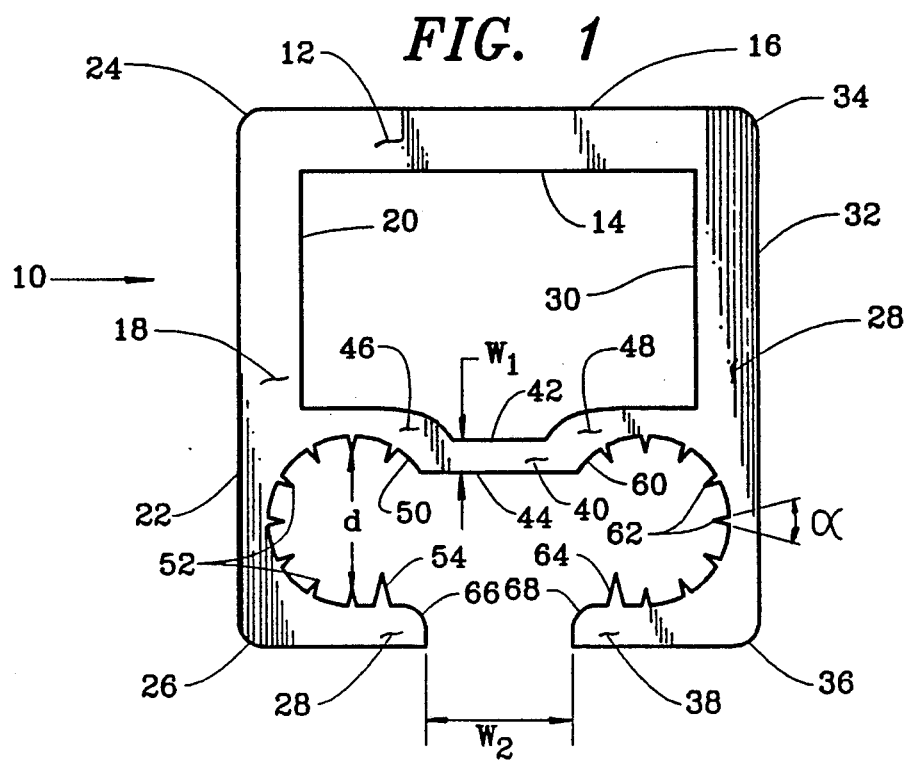
FIG. 1 is a cross sectional end view of the construction assembly of the instant invention.

Referring to the drawings in more detail, and more particularly to FIG. 1, there is shown a preferred embodiment of my construction assembly. Support member 10 is an elongated reusable channel formed from a single piece of material such as extruded aluminum or plastic. The support member defined by a base 12 having inside surface 14 and outside surface 16 with a thickness therebetween of 0.05 inches to 0.130 inches. A first upstand wall means 18 having a base portion inner surface 20 and an outer surface 22 extending perpendicular from lower edge 24 fixed to the base 12 to an upper edge corner 26 forming an insertion lip 28 perpendicular to from the wall 18 projecting inwardly from said upper edge 26 in the same plane as the base 12.

A second upstand wall means 28 having a base portion inner surface 30 and an outer surface 32 extending perpendicular from lower edge 34 fixed to the base 12 to an upper edge 36 forming an insertion lip 38 projecting inwardly from said upper edge 36 in the same plane as the base 12. The second upstand walls means is a mirror image of the first upstand wall means. Wall thickness assimilates base wall thickness, preferably 0.120 inches for industrial application and 0.60 inches for commercial application.

A traverse support member 40 is disposed between wall 18 and wall 28 preferably extruded therefrom located between insertion end corner 26, 36 and lower edge 24, 34 of each of the walls in a plane parallel to the base 12. The traverse support member 40 can be a substantial flat similar to base 12 or more desirably, have raised section 42 with staple surface 44. Surface 44 allows a covering to be permanently fastened to the channel 10 by use of staples or the like. Raised section 42 is structurally supported by curvature portions 46 and 48 whereby pressure exerted onto surface 44 is transmitted to wall 18 and 28 to prevent collapse of the traverse support member 40. Preferred wall thickness $W_1$ when made from aluminum is 0.06 inches for ease of stapling.

Circular surface 50 is formed from traverse support member 40 having curvature portion 46 in conjunction with wall 18 and insertion lip 24. Circular surface 50 having a plurality of teeth 52 spatially spaced therein and at least one projecting lock tooth 54 for securely locking a covering as described hereinafter. The preferred diameter d of the circular surface from tooth to tooth is approximately 0.187 inches, and angular shape of the teeth approximately 30 degrees.

Similarly, circular surface 60 is defined by traverse support member 40 having curvature portion 48 in conjunction with wall 28 and insertion lip 38. Circular surface 60 having a plurality of teeth 62 spatially spaced and formed therein with at least one projecting tooth 64 for locking. An insertion opening $W_2$ of approximately 0.27 inches is formed by first insertion corner 66 and second insertion corner 68.

Figure 2:
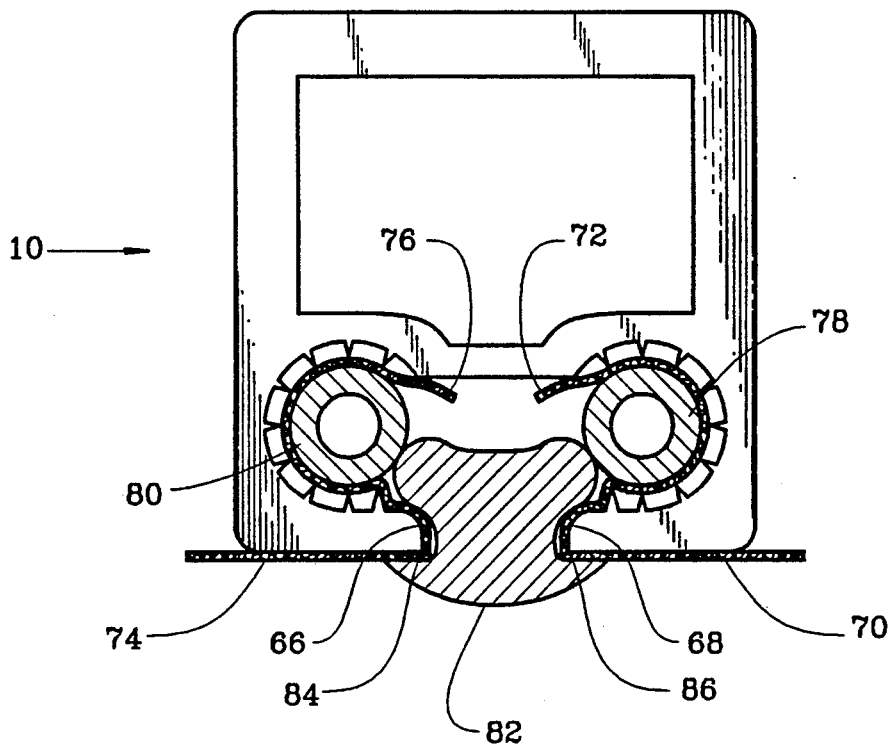
FIG. 2 is a cross sectional end assembly view illustrating a dual covering attachment with a pair of beads held in place by the trim tab.

Now referring to FIG. 2 with reference to FIG. 1 is a cross sectional end assembly view illustrating covering attachment. Cover 70 is wrapped around insertion end 38 and corner 68 over protruding tooth 64 and around circular surface 60 having teeth 62. End 72 of covering 70 is terminated within the channel. Similarly a second cover 74 can be wrapped around insertion end 28 and corner 66 over protruding tooth 54 and around circular surface 50 having teeth 52. End 76 of covering 74 is also terminated within the channel. Covering 70 is forcibly engaged with teeth 62 by placement of lock bead 78 within the confines of circular surface 60. Similarly, covering 74 forcibly engaged with teeth 52 by placement of lock bead 80 within the confines of circular surface 50. Lock beads 78 and 80 can be made of elongated flexible rubber or plastic having a circumference capable of insertion within the cavities formed by circular surfaces 50 and 60. Placement of trim tab 82, having longitudinal elongated slots 84 and 86 is operatively associated with lock beads 78, 80 and insertion space $W_2$ by engaging the insertion ends 66, 68 within the trim tab 82 longitudinal elongated slots 84, 86 forming a frictional engagement and seal with the channel. Trim tab 82 further pressing against lock beads 78, 80. It should be noted that enlarged tooth 54 and 64 are designed to protrude into a space formed between trim tab 82 and lock beads 78, 80 whereby the covering material is forced to crimp effectively locking the covering within the channel.

Figure 3:
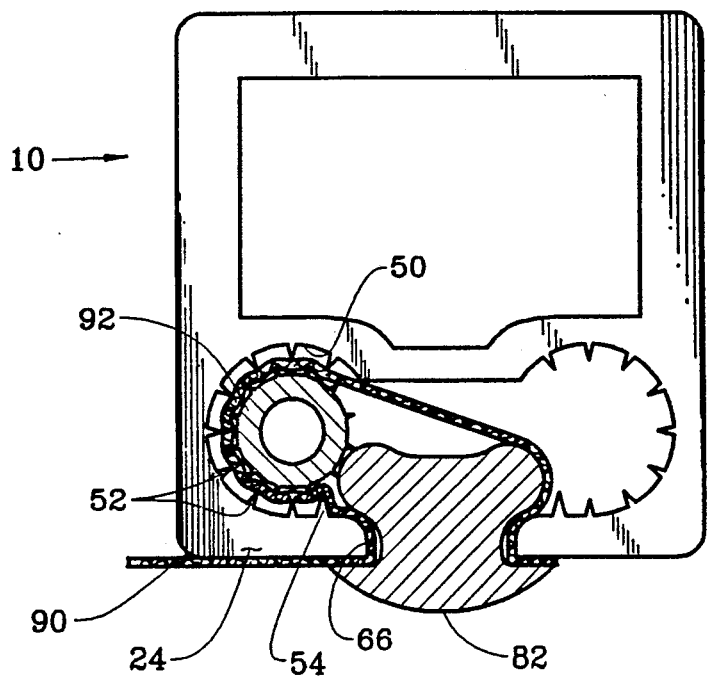
FIG. 3 is a cross sectional end assembly view illustrating a single covering attachment with a single splined bead held in place by the trim tab.

FIG. 3 illustrates a cross sectional end assembly view illustrating a single covering attachment. For example, an installer places cover 90 within channel 10 wherein covering 90 is wrapped around insertion end 24 and corner 66 over protruding tooth 54 and around circular surface 50 having teeth 52. Placement of splined lock bead 92 within the confines of circular surface 50. Splined lock bead 92 having corresponding spatially spaced teeth enhances engagement with the channel by further forcing the covering 90 between the teeth of the spline and the channel creating a deformed covering for frictionally engagement. Placement of trim tab 82 into insertion space engages insertion ends forming a frictional engagement and seal with the channel 10. The splined lock bead 92 allowing installation in areas of high winds and/or heavy snow loads.

Repositioning or replacement of the covering 90 simply requires that the trim tab 82 be lifted from its engagement with channel and the lock bead 92 removed. The covering 90 can then be repositioned with the channel or replaced with a new covering.

Figure 4:
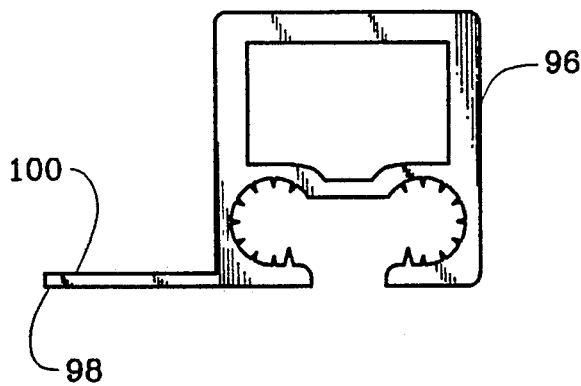
FIG. 4 is a cross sectional end view of a vertical variation of the construction assembly of the instant invention.
Figure 5:
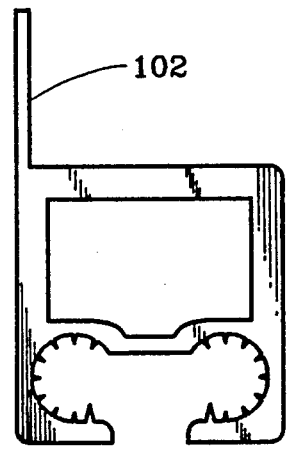
FIG. 5 is a cross sectional end view of a horizontal variation of the construction assembly of the instant invention.

FIGS. 4 and 5 illustrate alternative mounting means. For example, the support member extrusion 96 shown in FIG. 4 has a horizontal extrusion 98 typically used as a ledge for mounting ceiling panels on top of surface 100. FIG. 5 employs vertical extrusion 102 used as a facade or in support of a false ceiling.

Figure 6:
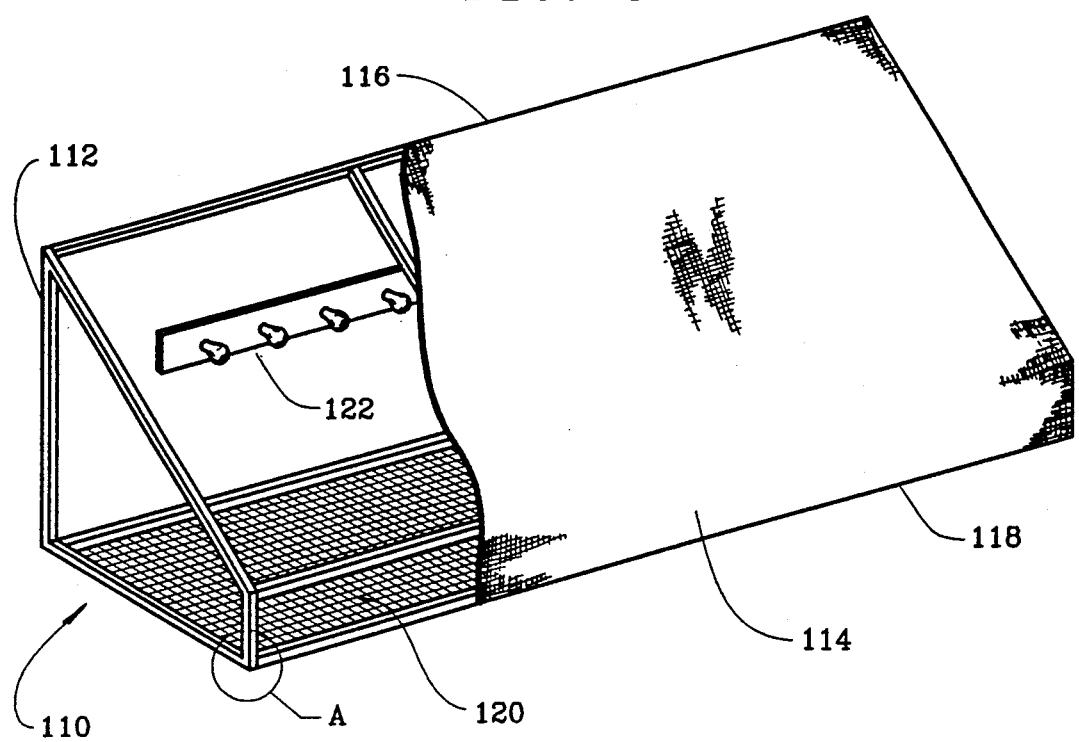
FIG. 6 is a prospective view illustrating the covering fastened to the construction assembly.
Figure 7:
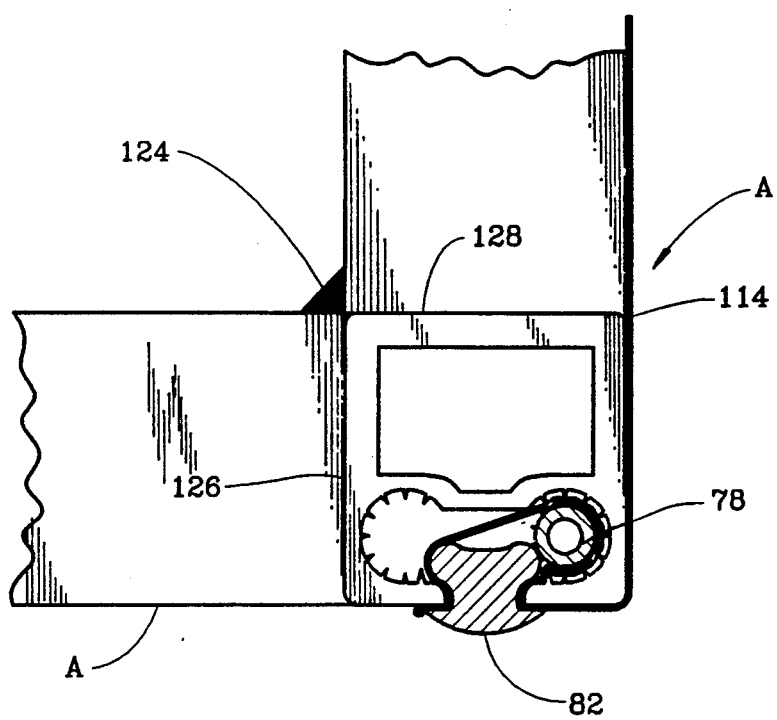
FIG. 7 is an enlarged cross-sectional view of corner "A" shown in FIG. 6.

With reference to FIGS. 6 and 7, a suggested construction assembly of the instant invention is shown as an awning 110, however, it should be understood that the apparatus can be used for a roof, canopy, boat, or the like coverings. The awning 110 comprises a plurality of support members 10 as defined by FIGS. 1-5, used in the alternative or in combination, coupled together in the form of a frame. The frame attaches to a wall structure, not shown, along surface 112. A covering 114 is encompasses the frame and is shown attached at the top 116 and the bottom of the awning. Use of a support member embodied in FIG. 4 allows a crate 120 to be placed across the bottom of the frame. A lighting bar 122 can be placed within the confines of the frame allowing the awning to backlit.

Enlarged section "A" illustrates the use of the attachment of the covering within the channel similar to that as illustrated in FIG. 3. The lock bead 78 encompassed by trim tab 82 securely fastening covering 114 to the support member. Support members can be welded 124 or bolted to together at edges 126 and 128.

Figure 8:
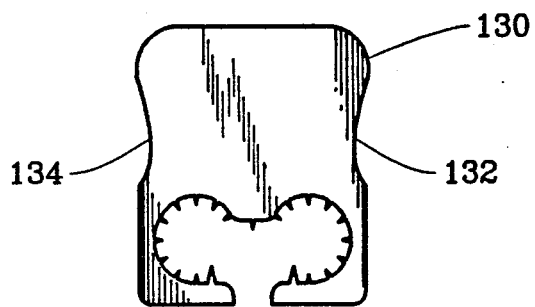
FIG. 8 is a cross sectional end view a variation of the construction assembly of the instant invention.
Figure 9:
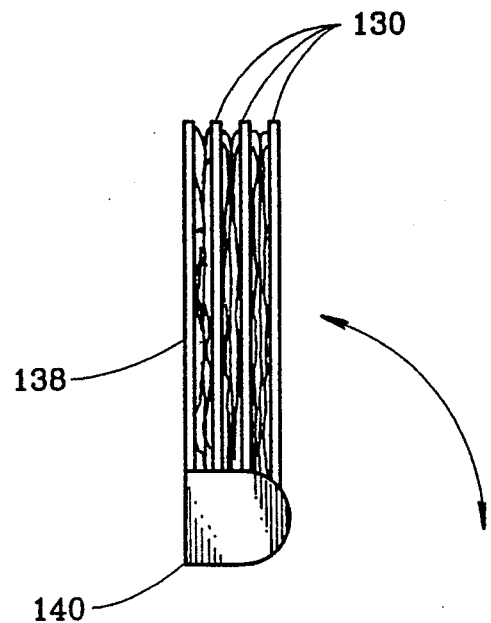
FIG. 9 is a prospective view illustrating a collapsible awning.
Figure 10:
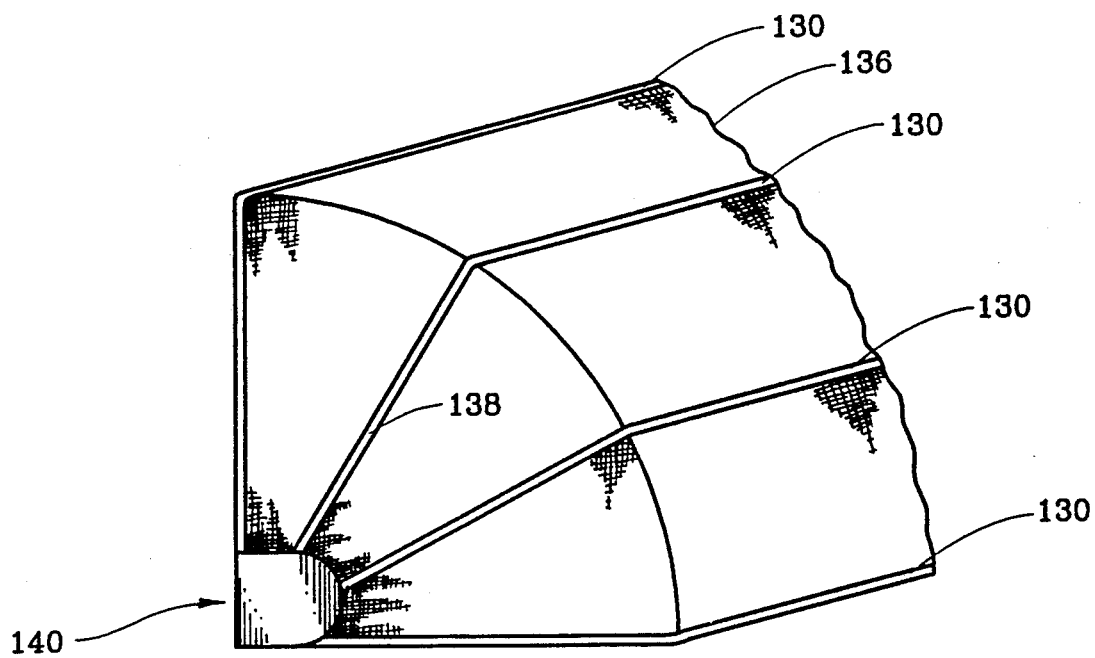
FIG. 10 is a side view of the collapsible awning.

Now referring to FIGS. 8-10, shown is an alternative embodiment wherein the instant invention is used in a collapsible awning in a method known as Frenze. The support structure 130 made from solid material with a curvature sides 132 and 134 for decorative display. Coupling to a covering includes all the advantages of the dual circular surface design elaborated above and incorporated herein.

The awning in an open position, shown in the prospective view, utilizes support member 130 securely fastening covering 136 allowing the awning to be opened stretching out covering 136. Supports 138 are coupled to a rotatable section 140 allowing the support to rotate therein. Supports 138 can also have covering attached thereto by employing support member 130 as its structure. Collapsing the awning allows flexible covering 136 to fold between the supports 138 effectively storing the awning for later use.

It will be apparent that modifications in accordance with the present invention can be made by those skilled in the art without departing from the spirit thereof and it is equally apparent that the apparatus can be of a variety of sizes having the above described functionality. It will be obvious to those skilled in the art that various changes may be made without departing from the scope of the invention and the invention is not to be considered limited to what is shown in the drawings and described in the specification.

What I claim as new and desire to secure by Letters Patent of the United States is:

1. A construction assembly securely attaching a covering material to a fixture comprising: a covering material; an elongated reusable support member defined by a base, a first upstand wall means having a lower edge fixed to said base and a upper edge fixed to an insertion lip projecting inwardly from said upper edge in a parallel plane to said base, a second upstand wall means having a lower edge fixed to said base and an upper edge fixed to an insertion lip projecting inwardly from said upper edge in a parallel plane to said base, a traverse support member disposed between said first and second wall means located between the upper edge and lower edge of each of said walls in a plane parallel to said base a pair of elongated substantially circular surfaces formed from an inner surface of the transverse support member in conjunction with each of said upstand walls and associated lips; means for releasably fastening said covering material to said circular surfaces; and, an elongated deformable trim pad maintaining at least one elongated bead in position by frictional engagement with at least one surface of said support member.

2. The construction assembly recited in claim 1, wherein said first upstand walls means is a mirror image of said second upstand wall means.

3. The construction assembly recited in claim 1, wherein said circular surfaces have a plurality of teeth spatially formed in the surface thereof.

4. The construction assembly recited in claim 3, wherein said circular surface has at least one projecting tooth for locking the covering within said circular surface.

5. The construction assembly recited in claim 1, wherein said trim pad has at least two coplanar longitudinal slots defined therein.

6. The construction assembly recited in claim 5, wherein said elongated trim pad is operatively associated with said insertion lip of said channel locking said covering material therein and forming a tight seal thereby.

7. The construction assembly recited in claim 1, wherein said rigid lock member is made from a single piece of material.

8. The construction assembly recited in claim 7, wherein said material is metal.

9. The construction assembly recited in claim 8, wherein said metal is extruded aluminum.

10. The construction assembly recited in claim 7, wherein said material is plastic.

11. The construction assembly recited in claim 1, wherein said means for releasably fastening said covering material to said circular surfaces is further defined as at least one elongated lock bead for disposition within said circular surfaces.

12. The construction assembly recited in claim 1, wherein said means for releasably fastening said covering material is two lock beads.

13. The construction assembly recited in claim 11, wherein said lock bead is splined.

14. A construction assembly securely attaching a covering material to a fixture comprising: a covering material; an elongated reusable support member formed from a single piece of extruded aluminum defined by a base, a first upstand wall means perpendicular to said base and an insertion lip perpendicular to said first wall projecting inwardly from said first wall in a parallel plane to said base, a second upstand wall means perpendicular to said base and an a second insertion lip perpendicular to said second wall projecting inwardly from said second wall in a parallel plane to said base, a traverse support member disposed between said base and insertion lip of each of said walls in a plane parallel to said base, a first elongated substantially circular surface formed from an inner surface of said traverse support member in conjunction with an inner surface of said first wall and associated lip having a plurality of teeth spatially spaced and formed therein, a second elongated substantially circular surface formed from an inner surface of said traverse support member in conjunction with an inner surface of said second wall and associated lip having a plurality of teeth spatially spaced and formed therein; at least one elongated locking bead for disposition within said circular surfaces; and, an elongated deformable trim pad having at least two coplanar longitudinal slot defined therein operatively associated with first and second wall insertion lip maintaining at least one elongated bead in position by frictional engagement with at least one surface of said support member.

15. The construction assembly recited in claim 14, wherein said circular surface has at least one enlarged projecting tooth for locking the covering within said circular surface.

16. The construction assembly recited in claim 14, wherein said lock bead is splined.

* * * * *